R. FRENCH
Ox-Shoe.

No. 159,026.  Patented Jan. 26, 1875.

Witnesses.
T. C. Smith
Edmund Masson

Inventor:
Raymond French,
By atty. A. B. Stoughton.

UNITED STATES PATENT OFFICE.

RAYMOND FRENCH, OF SEYMOUR, CONNECTICUT.

IMPROVEMENT IN OX-SHOES.

Specification forming part of Letters Patent No. 159,026, dated January 26, 1875; application filed December 22, 1874.

*To all whom it may concern:*

Be it known that I, RAYMOND FRENCH, of Seymour, in the county of New Haven and State of Connecticut, have made certain new and useful Improvements in Ox-Shoes; and I do hereby declare the following to be a full, clear, and exact description of the same, reference being had to the accompanying drawings, making a part of this specification, in which—

Figure 1:
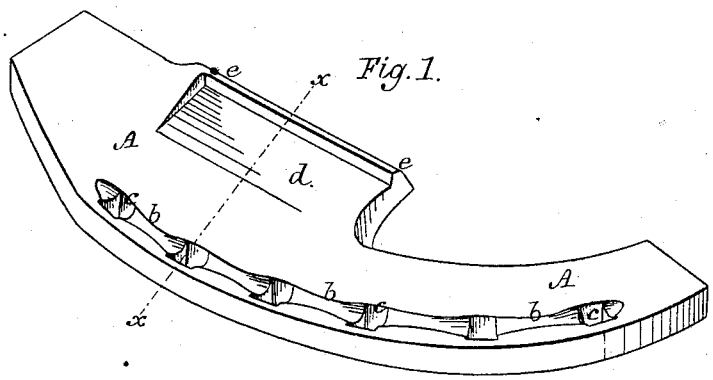
Figure 2:
Figure 3:
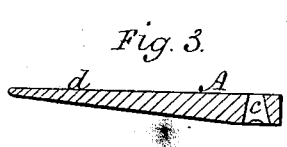

Figure 1 represents a view of the under side of my ox-shoe. Fig. 2 represents a section through the shoe in the line $x\ x$ of Fig. 1. Fig. 3 represents a section through an ox-shoe as commonly made, and is made to more clearly illustrate the difference between such and that I have invented.

The "pad" or "ball" of an ox-shoe has heretofore been made inclined on that surface of it which comes against the ground, the other side or surface being level, so as to fit against the hoof of the animal.

Oxen naturally lean toward or from each other when worked in pairs, causing a lateral strain upon the shoes, and this, together with the inclination or slope of the pad of the shoe, renders them liable to slip sidewise, and thus tear off their shoes.

The object of my invention is to avoid this sidewise slipping, and so prevent the tearing off of shoes; and my invention consists in making or turning a rib, flange, or projection on the pad, and by preference at or near its outer extremity, which rib, flange, or projection is in reality a side calk, to prevent the animal from slipping sidewise, and so tearing off its shoes.

To enable those skilled in the art to make and use my invention, I will proceed to describe the same with reference to the drawings.

A represents an ox-shoe, which may have front and rear calks wrought upon it in the usual way. $b$ is the crease, and $c$ the nail-holes therein. $d$ is the pad of the shoe, sometimes called the "ball."

This pad has heretofore been made so as to represent, in cross-section, the form shown in Fig. 3—that is, with the under surface inclined, which, together with the inclined position of the legs of the animals when drawing, cause them to slip sidewise. To prevent this I make a rib, flange, or side calk, $e$, upon the shoes, which will resist side slipping, and save the shoes from being torn off.

The pad, it is understood, is on the inner side of the shoe, and the rib, flange, or calk $e$ is on the inner edge or part of the pad.

Having thus fully described my invention, what I claim is—

In combination with the pad $d$ of an ox-shoe, the flange, rib, or inside calk, $e$, as and for the purpose described and represented.

RAYMOND FRENCH.

Witnesses:
CUSTER FRENCH,
C. P. HURD.